United States Patent
Reznik

[19]

[11] Patent Number: 5,928,699
[45] Date of Patent: Jul. 27, 1999

[54] APPARATUS AND METHOD FOR RAPID COOLING OF LIQUIDS

[76] Inventor: David Reznik, 12690 Viscaino Rd., Los Altos Hills, Calif. 94022

[21] Appl. No.: 08/904,251

[22] Filed: Jul. 31, 1997

[51] Int. Cl.[6] ................. A23L 3/00; H05B 6/00
[52] U.S. Cl. .............. 426/524; 62/268; 99/454; 99/470; 165/104.27; 426/522
[58] Field of Search ..................... 426/524, 520, 426/522; 99/454, 455, 470; 62/268, 269; 165/104.21, 104.27

[56] References Cited

U.S. PATENT DOCUMENTS

| | | | |
|---|---|---|---|
| 2,996,898 | 8/1961 | Hosken et al. | 62/268 |
| 3,771,431 | 11/1973 | Ehrenberg et al. | 99/281 |
| 5,063,663 | 11/1991 | Casterline | 165/158 |
| 5,192,499 | 3/1993 | Sakai et al. | 165/158 |
| 5,317,882 | 6/1994 | Ritenour | 62/268 |
| 5,443,857 | 8/1995 | Arph et al. | 99/470 |
| 5,465,655 | 11/1995 | Papetti | 99/470 |
| 5,474,122 | 12/1995 | Pierce | 165/158 |
| 5,518,066 | 5/1996 | Francis et al. | 165/158 |
| 5,583,960 | 12/1996 | Reznik | 99/358 |
| 5,607,613 | 3/1997 | Reznik | 99/358 |

*Primary Examiner*—George Yeung
*Attorney, Agent, or Firm*—Greenblum & Bernstein, P.L.C.

[57] ABSTRACT

Apparatus for rapid cooling of a liquid to be cooled including a heat exchanger including a housing for containing a cooling liquid, a plurality of cooling conduits traversing the housing in thermal contact with the cooling liquid and defining a cooling conduit inlet and a cooling conduit outlet and a vacuum generator associated with the interior of the housing for reducing the pressure in the housing until the cooling liquid boils whereby a heat transfer coefficient of the cooling liquid is generally maximized.

7 Claims, 3 Drawing Sheets

APPARATUS AND METHOD FOR RAPID COOLING OF LIQUIDS

FIELD OF THE INVENTION

The present invention relates to cooling of liquids generally and more particularly to cooling of fluids which have been heat processed.

BACKGROUND OF THE INVENTION

There are known various methods for cooling hot liquids. The following U.S. Pat. Nos. are believed to represent a sampling of the state of the art: 5,518,066; 5,465,655; 5,474,122; 5,443,857; 5,317,882; 5,192,499; 5,063,663.

In food processing, particularly processing of proteinaceous food products, the speed of cooling is exceedingly critical. Failure to cool a food product sufficiently quickly may lead to undesirable effects on the flavor, aroma, texture or other important characteristics of the food product.

SUMMARY OF THE INVENTION

The present invention seeks to provide apparatus and a method for cooling liquids which is highly efficient and produces extremely rapid cooling.

There is thus provided in accordance with a preferred embodiment of the present invention apparatus for rapid cooling of a liquid to be cooled including a heat exchanger including a housing for containing a cooling liquid, a plurality of cooling conduits traversing the housing in thermal contact with the cooling liquid and defining a cooling conduit inlet and a cooling conduit outlet and a vacuum generator associated with the interior of the housing for reducing the pressure in said housing until said cooling liquid boils whereby a heat transfer coefficient of said cooling liquid is generally maximized.

Preferably, there is also provided a condenser for condensing vapors of the cooling liquid. Alternatively, a continuously operative vacuum pump and a supply of cooling liquid may be provided.

In accordance with a preferred embodiment of the present invention, the condenser may include a plurality of preheating conduits traversing the housing in thermal contact with vapors of the cooling liquid and defining a preheating conduit inlet and a preheating conduit outlet.

Further in accordance with a preferred embodiment of the present invention the system also includes an electroheater which receives preheated liquid food product from the preheating conduit outlet, rapidly heats the liquid food product and then supplies the heated food product to the cooling conduit inlet for rapid cooling thereof.

There is also provided in accordance with a preferred embodiment of the present invention a method for rapid cooling of a liquid to be cooled including supplying the liquid to be cooled to a heat exchanger including a housing for containing a cooling liquid, a plurality of cooling conduits traversing the housing in thermal contact with the cooling liquid and defining a cooling conduit inlet and a cooling conduit outlet, the supplying step operating under vacuum for reducing the pressure in said housing such that said cooling liquid boils whereby a heat transfer coefficient of said cooling liquid is generally maximized.

Preferably, the method also includes condensing vapors of the cooling liquid or alternatively operating a vacuum pump continuously.

In accordance with a preferred embodiment of the present invention, a liquid may also be preheated using a plurality of preheating conduits traversing the housing in thermal contact with vapors of the cooling liquid and defining a preheating conduit inlet and a preheating conduit outlet.

Further in accordance with a preferred embodiment of the present invention the method includes operation of an electroheater which receives preheated liquid food product from the preheating conduit outlet, rapidly heats the liquid food product and then supplies the heated food product to the cooling conduit inlet for rapid cooling thereof.

Ideally in the manufacture of shelf-stable milk in accordance with a preferred embodiment of the present invention, raw material, such as milk at about 4 degrees centigrade may be supplied to the preheating conduit inlet and is preheated to approximately 74 degrees centigrade and then supplied from the preheating conduit outlet to the electroheater. The electroheater heats the milk very rapidly to about 146 degrees centigrade and then supplies the milk to the cooling conduit inlet. The milk is rapidly cooled, typically in 2–3 seconds, down to about 76 degrees centigrade.

BRIEF DESCRIPTION OF THE DRAWINGS

The present invention will be understood and appreciated more fully from the following detailed description, taken in conjunction with the drawing in which.

DETAILED DESCRIPTION OF A PREFERRED EMBODIMENT

Figure 1:
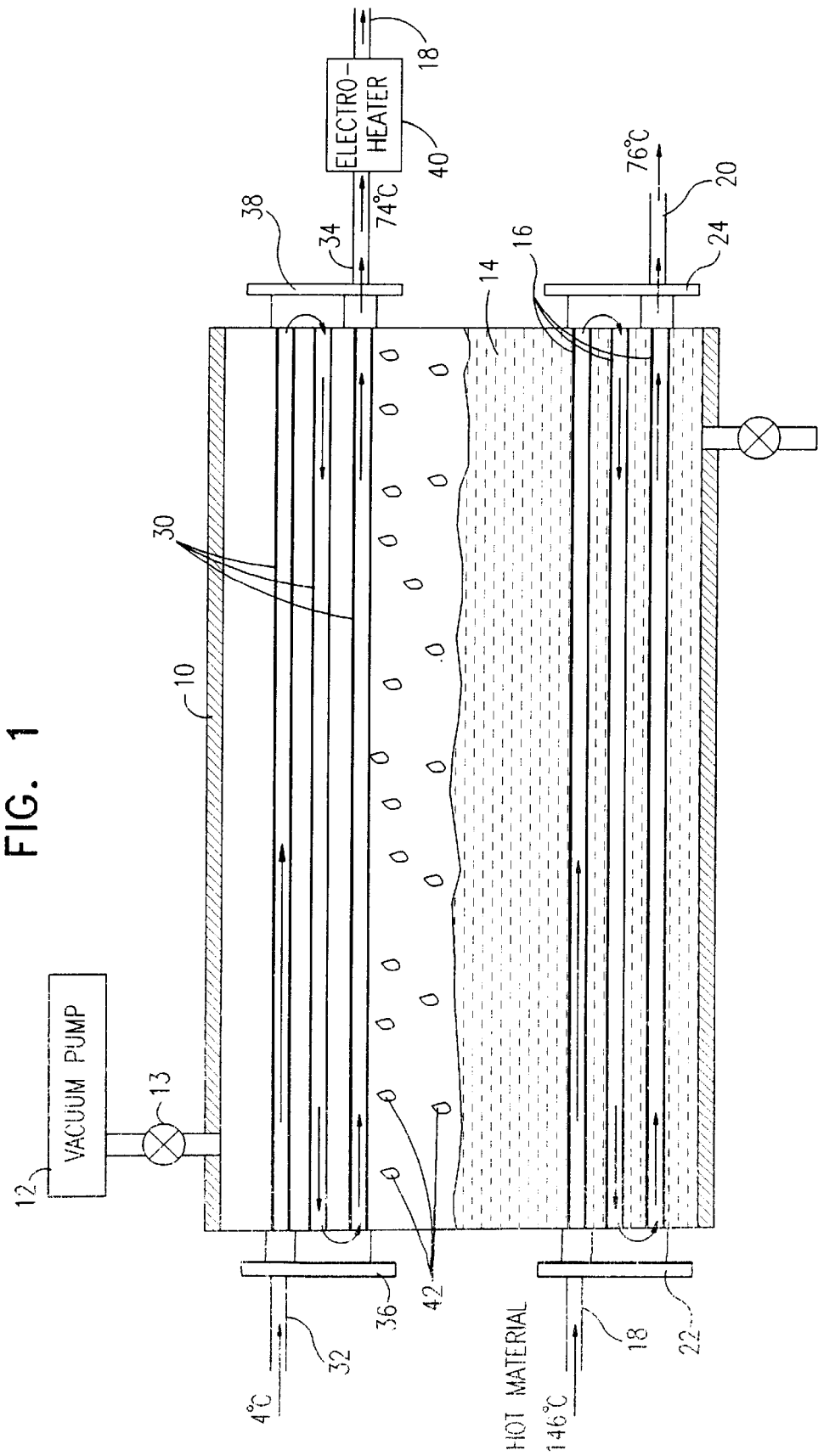
FIG. 1 is a simplified illustration of a rapid cooler and preheater associated with an electroheater in accordance with a preferred embodiment of the present invention.

Reference is now made to FIG. 1, which is a simplified illustration of a rapid cooler and preheater associated with an electroheater in accordance with a preferred embodiment of the present invention. The rapid cooler and preheater preferably comprises a thermally insulated housing 10, the interior of which communicates with a vacuum pump 12 via a shut-off valve 13.

The housing 10 contains a cooling liquid, 14, typically water, which preferably fills about half of the volume of the interior of the housing 10. Disposed within the housing 10 are a plurality of cooling conduits 16, which traverse the housing in thermal contact with the cooling liquid 14 and define a cooling conduit inlet 18 and a cooling conduit outlet 20. Preferably, there are provided removable cooling inlet and cooling outlet manifolds 22 and 24 respectively, which may be clamped onto housing 10 in sealing engagement therewith and with cooling conduits 16.

The vacuum pump 12 is preferably operative at the beginning of the operation of the apparatus in order to pump the air out of the apparatus and to produce a vacuum condition, of about 29" of mercury (737 mm) in the housing 10. At a vacuum state of 29" of mercury, the cooling water 14 begins to boil and water vapor fills the housing 10. At this point the valve 13 is closed and the vacuum pump 12 is shut off and disconnected from the apparatus. Thus, in the absence of air or other non-condensable gases, the pressure in the housing is generally equal to the vapor pressure of the boiling water 14.

The preferred equilibrium state is at or near boiling and the preferred initial vacuum which is required to keep water in this equilibrium state is 29" of mercury (737 mm) when the cooling liquid is at room temperature.

In accordance with a preferred embodiment of the present invention, there are also provided a plurality of preheating conduits 30 traversing the housing 10 in thermal contact with vapors of the cooling liquid 14 and defining a preheating conduit inlet 32 and a preheating conduit outlet 34, Preferably, there are provided removable preheating inlet and preheating outlet manifolds 36 and 38 respectively, which may be clamped onto housing 10 in sealing engagement therewith and with preheating conduits 30.

Preferably conduits 16 and 30 are elongate to permit inspection and cleaning thereof with a brush. The length and diameter of the conduits 16 and 30 are preferably selected to produce turbulent flow of liquid therethrough.

Further in accordance with a preferred embodiment of the present invention the system also includes an electroheater 40 which receives preheated liquid food product from the preheating conduit outlet 34, rapidly heats the liquid food product and then supplies the heated food product to the cooling conduit inlet 18 for rapid cooling thereof.

The electroheater 40 may be any suitable electroheater. Examples of preferred electroheaters which are suitable are described in the following U.S. Pat. Nos. of the present inventor: 5,607,613 and 5,583,960.

From the beginning of the operation, the water is boiling and its temperature rises to about the exit temperature of the cooled fluid. In such a situation, the water vapor condenses in the absence of non-condensable gas. This maximizes the heat transfer coefficient. The condensed vapors fall back as droplets 42 at the boiling point temperature. Accordingly there is no sensible heating or cooling of the water in the housing and the vapors and the condensate are generally at the same boiling temperature.

Before a food product is supplied to the apparatus a heated liquid, which simulates the product to the processed, is preferably passed through the apparatus until steady state conditions are reached.

Ideally in the manufacture of shelf-stable milk in accordance with a preferred embodiment of the present invention, raw material, such as milk at about 4 degrees centigrade may be supplied to the preheating conduit inlet and is preheated to approximately 74 degrees centigrade and then supplied from the preheating conduit outlet to the electroheater. The electroheater heats the milk within a fraction of a second to about 146 degrees centigrade and then supplies the milk to the cooling conduit inlet. The milk is rapidly cooled, typically in 2–3 seconds, down to about 76 degrees centigrade.

Figure 2:
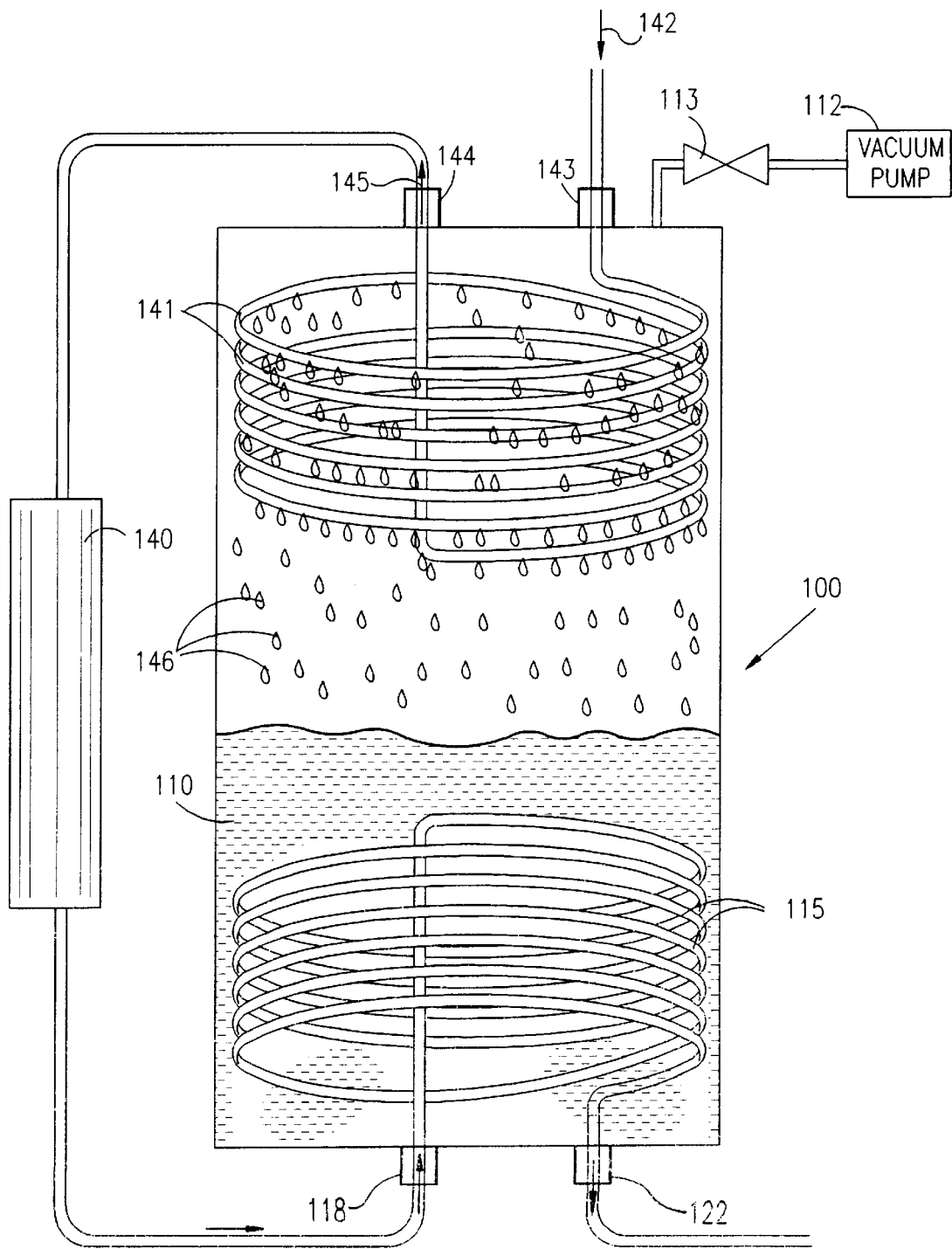
FIG. 2 is a simplified illustration of a rapid cooler and preheater associated with an electroheater in accordance with another preferred embodiment of the present invention.

Reference is now made to FIG. 2 which is a simplified illustration of a rapid cooler and preheater constructed and operative according to another embodiment of the present invention.

The rapid cooler and preheater preferably comprises a thermally insulated housing 100, the interior of which is in communication with a vacuum pump 112 via a shut-off valve 113.

The housing 100 contains a cooling liquid 110, such as water, which is in thermal contact with a cooling coil 115. The cooling coil includes an inlet conduit 118 and an outlet conduit 122. A heated product enters the housing 100 at the inlet 118 after being heated by an electroheater 140 and exits the apparatus at outlet 122, at a lower temperature.

Disposed at the top of the housing 100 is a condensing coil 141. A cold product 142 enters the heating coil 141 through an inlet conduit 143 and exits at an outlet conduit 144. The product 145 exiting at outlet conduit 144 is rapidly heated, in a few seconds, in the electroheater 140.

In operation the vacuum pump 112 reduces the pressure in the housing 100, until the cooling fluid 110 begins to boil. If water is used as the cooling fluid 110, a vacuum condition of approximately 29" of mercury is required for the water to boil, at ambient conditions. At the required vacuum condition, the shut-off valve 113 is closed and the operation is performed in a closed system.

The water vapor condenses on the cooling coil 115 forming droplets 146 which drop back into the lower section of the housing 100.

The cold product 142 enters the housing 100 through the inlet 143 and is heated in the coil 141 by the latent heat of condensation of the water vapor. The heated product 145 exits the housing 100 at outlet 144 and is heated by the electroheater 140 in a few seconds. The electroheated product is then cooled in the cooling coil 115 and exits the housing 100 via the outlet 122.

Figure 3:
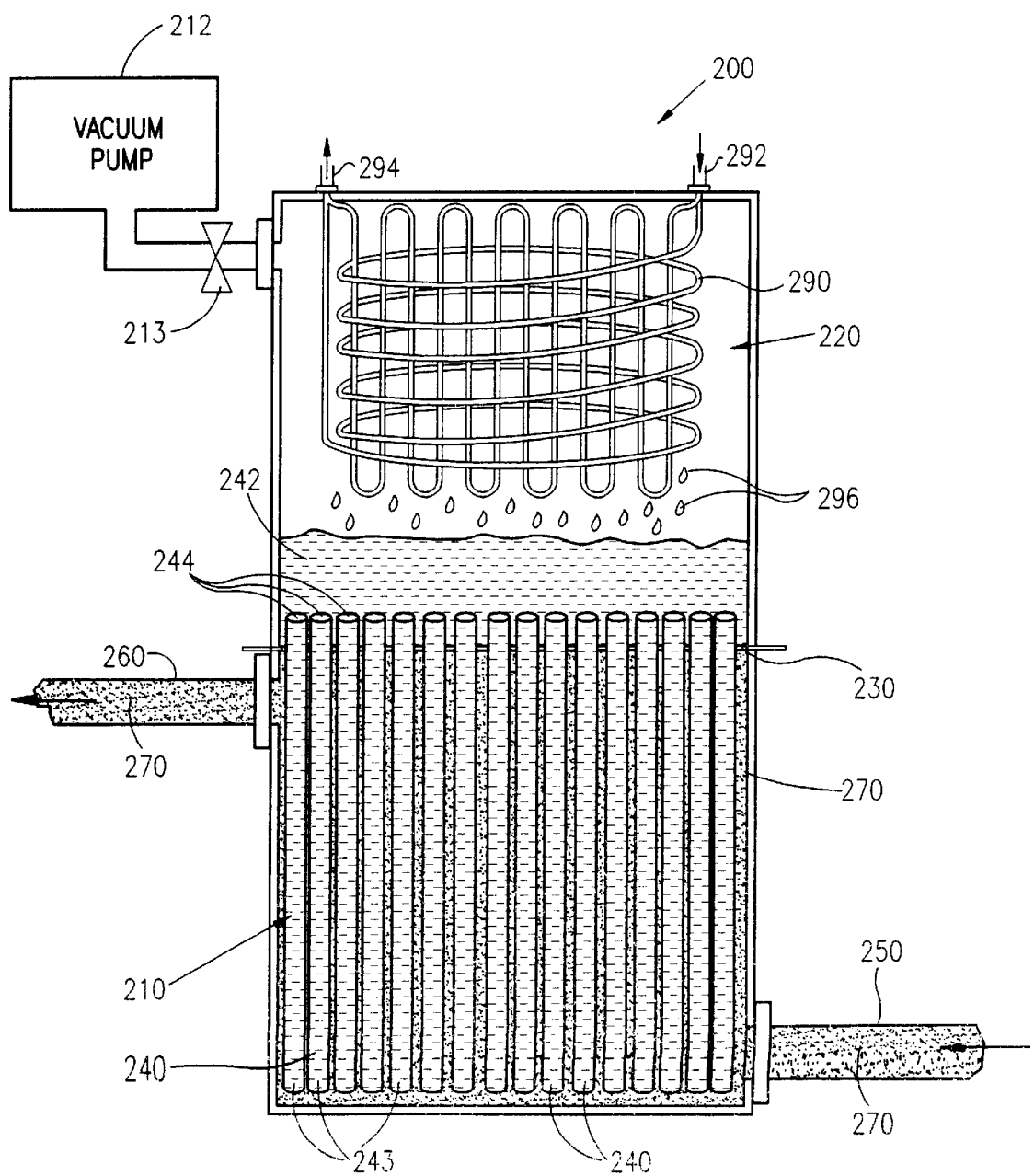
FIG. 3 is a simplified illustration of a rapid cooler and preheater which may be associated with an electroheater in accordance with yet another preferred embodiment of the present invention.

Reference is now made to FIG. 3 which is a simplified illustration of a rapid cooler constructed and operative according to yet another embodiment of the present invention.

The rapid cooler preferably comprises a thermally insulated housing 200, the interior of which is in communication with a vacuum pump 212 via a shut-off valve 213.

The housing 200 is preferably divided into a cooling chamber 210 and a condensing chamber 220 by a dividing seal 230. The dividing seal 230 provides a fluid-tight seal between the cooling chamber 210 and the condensing chamber 220.

The cooling chamber 210 comprises a plurality of cooling bodies preferably in the form of hollow cooling tubes 240, the interiors of which are filled with cooling fluid, such as water and communicate with a body 242 of cooling fluid which lies over the dividing seal 230 in the condensing chamber 220.

Each cooling tube 240 extends from the base of the heating chamber 210 into the condensing chamber 220. The dividing seal 230 is constructed so as to accommodate the cooling tubes 240, as shown in FIG. 3, while maintaining a fluid-tight seal around each of the tubes 240.

Each cooling tube 240 is closed at its base end 243 within the cooling chamber 210 and is open at its upper end 244 located in the condensing chamber 220.

A fluid 270 to be cooled enters the cooling chamber 210 through an inlet conduit 250 and exits the cooling chamber 210 via an outlet conduit 260 at a lower temperature due to the heat given up to the cooling fluid in the tubes 240.

The fluid 270 fills the heating chamber 210 to a level above the height of the outlet conduit 260, as illustrated in FIG. 3, but below the dividing seal 230.

A condensing coil 290 is located in the condensing chamber 220, as shown in FIG. 3. A cooling fluid, which is preferably a product to be preheated (not shown) enters the condensing coil 290 at an inlet 292 and exits the condensing coil 290 at an outlet 294.

In operation the vacuum pump 212 reduces the pressure in the housing 200, until the cooling fluid begins to boil. If water is used as the cooling fluid, a vacuum condition of approximately 29" of mercury is required for the water to boil at room temperature. At the required vacuum condition, the shut-off valve 213 is closed and operation is performed in a closed system.

The water vapor condenses on the condensing coil 290 forming droplets 296 which drop back into the lower section of the condensing chamber 220.

It will be appreciated by persons skilled in the art that the present invention is not limited to what has been particularly shown and described hereinabove. Rather the scope of the present invention includes both combinations and subcombinations of the various features described hereinabove as well as variations and development thereof which would naturally occur to a person of ordinary skill in the art upon reading the disclosure and which are not in the prior art.

I claim:

1. Apparatus for rapid cooling of a liquid to be cooled comprising a heat exchanger including:
   a housing comprising an interior for containing a cooling liquid;
   a plurality of cooling conduits traversing the housing in thermal contact with the cooling liquid and defining a cooling conduit inlet and a cooling conduit outlet;
   a vacuum generator associated with the interior of the housing for reducing the pressure in said housing until said cooling liquid boils whereby a heat transfer coefficient of said cooling liquid is generally maximized; and
   a condenser for condensing vapors of said cooling liquid
   and wherein said condenser comprises a plurality of preheating conduits traversing the housing in thermal contact with vapors of the cooling liquid and defining a preheating conduit inlet and a preheating conduit outlet.

2. Apparatus according to claim 1 and also comprising an electroheater which receives preheated liquid food product from the preheating conduit outlet, rapidly heats the liquid food product and then supplies the heated food product to the cooling conduit inlet for rapid cooling thereof.

3. Apparatus according to claim 1 and wherein said plurality of cooling conduits are elongate.

4. Apparatus according to claim 1 and wherein said plurality of cooling conduits are configured such that liquid flow therethrough during normal operation is turbulent.

5. A method for rapid cooling of a liquid to be cooled comprising:
   supplying the liquid to be cooled to a heat exchanger including a housing for containing a cooling liquid, a plurality of cooling conduits traversing the housing in thermal contact with the cooling liquid and defining a cooling conduit inlet and a cooling conduit outlet;
   evacuating substantially all non-condensable gases from the interior of said housing at least during said supplying, whereby a heat transfer coefficient of said cooling liquid is generally maximized;
   condensing vapors of said cooling liquid;
   and also comprising preheating the liquid to be cooled using a plurality of preheating conduits traversing the housing in thermal contact with vapors of the cooling liquid and defining a preheating conduit inlet and a preheating conduit outlet.

6. A method according to claim 5 and also comprising operation of an electroheater which receives preheated liquid food product from the preheating conduit outlet, rapidly heats the liquid food product and then supplies the heated food product to the cooling conduit inlet for rapid cooling thereof.

7. A method according to claim 5 and wherein said liquid to be cooled flows through said plurality of cooling conduits in a turbulent flow.

* * * * *